3,552,126
HYPERGOLIC HYDRAZINE AND AMINE PROPELLANT AND ROCKET PROPULSION METHOD

Robert C. Ahlert, Woodland Hills, Jacob Silverman, Canoga Park, Stanley A. Greene, Woodland Hills, and Richard K. Young, Canoga Park, Calif., assignors to North American Rockwell Corporation, a corporation of Delaware
No Drawing. Filed Apr. 2, 1959, Ser. No. 804,062
Int. Cl. C06d 5/08
U.S. Cl. 60—212          10 Claims This invention relates to an improved rocket propellant. More particularly, this application relates to a stabilized rocket propellant and a method of providing rocket propulsion.

The criterion by which rocket propellants are classified is specific impulse, $I_s$, defined as thrust, in pounds, divided by the total mass flow of fuel and oxidizer, in pounds per second. Specific impulse is thus given in units of "seconds." Oxidizer-fuel propulsion system compositions with a high specific impulse are well known in the art. Such system, however, usually employ a non-storable oxidizer such as liquid oxygen for example. The non-storability of certain rocket propellant components results in a tactical disadvantage in providing rockets which cannot be held in a full state of instantaneous readiness. Consequently, a search has centered on the development of a high energy, storable, liquid system which is invariably hypergolic (spontaneously combustible on fuel-oxidizer contact) and remains so even at very low pressures (high altitudes) and temperatures. Nitrogen tetroxide, $N_2O_4$, is a storable oxidizer. Unsymmetrical dimethyl hydrazine, UDMH, is a well known rocket fuel. The system $N_2O_4$-UDMH, however, produces a specific thrust much below that of the non-storable oxidizer liquid oxygen with certain other storable fuels. The use of hydrazine with a storable oxidizer such as nitrogen tetroxide would provide a specific impulse comparable to that obtainable by the use of liquid oxygen with hydrocarbon fuel. However, unusual and severe difficulties are frequently encountered in the use of hydrazine. Stable thrust chamber configurations exhibit combustion instability and explosions take place in areas of high heat flux at relatively high frequency. Homogeneous decomposition of hydrazine at elevated bulk temperatures, in both gas and liquid phases, are presumed to be a major source of these operating problems. In addition, heterogeneous or surface effects have a contributory influence; this is the case because (1) not all hardware components fabricated of catalytically active materials, i.e., nickel, can be replaced or completely passivated and (2) complete descaling, cleaning, and passivation of all interior surfaces is difficult and impossible to insure through inspection. A need exists for a stabilized hydrazine fuel which could be used with a storable oxidizer to provide a rocket propellant fuel system having a high specific impulse.

It is an object of this invention to provide an improved hydrazine-containing rocket fuel composition.

Another object of this invention is to provide a storable rocket fuel system possessing a high specific impulse.

It is also an object of this invention to provide a method of producing thrust.

The above and other objects of this invention will become more apparent from the discussion which follows:

The objects of this invention are accomplished by providing a hydrazine-containing fuel, having certain additives therein for the purpose of stabilizing the fuel against thermal decomposition. The additives may be nitrogen-containing hydrocarbons such as ethylene diamine and pyridine, hydroxy-substituted hydrocarbons such as ethanol, hydroxy and amino nitrogen-hydrocarbons such as ethanolamine, ketones such as acetone. The fuel composition may contain one or more of the above mentioned additives.

An example of the composition of this invention is hydrazine containing substantially ten weight percent ethylenediamine. Such a composition is found to vaporize evenly upon contact with a heated metal plate. Satisfactory performance is obtained when the composition is used as a propellant in a rocket motor. No explosion of the motor occurs.

An embodiment of this invention is a composition of matter comprising (1) a hydrazine compound having the general formula $R_1R_2NNR_3R_4$, wherein each of $R_1$, $R_2$, $R_3$, and $R_4$ is selected from the class consisting of hydrogen and hydrocarbon groups having from one to about twelve carbon atoms and wherein at least about 75% of the sum of said $R_1$, $R_2$, $R_3$, and $R_4$ groups in the composition as a whole are hydrogen atoms, and (2) from about 0.5 weight percent to about 25 weight percent, based on the total weight of the composition, of at least one additive compound selected from the class consisting of (a) carbon, hydrogen, and nitrogen-containing compounds having from one to about twelve carbon atoms and from one to about seven nitrogen atoms, (b) hydroxy-substituted hydrocarbons having from one to about twelve carbon atoms, from one to about six hydroxy groups, and from zero to about five ether-linked oxygen atoms therein, (c) carbon, hydrogen, oxygen, and nitrogen-containing compounds having from one to about twelve carbon atoms, from one to about three nitrogen atoms from one to about three hydroxy groups, and from zero to about three ether-linked oxygen atoms, (d) ketones having one to about twelve carbon atoms, one to about three oxygen atoms, and zero to about two amino nitrogen atoms.

The hydrazine type compound employed in the composition of this invention has the general formula $R_1R_2NNR_3R_4$, wherein $R_1$, $R_2$, $R_3$, and $R_4$ are hydrogens or hydrocarbon groups. When hydrocarbon groups are substituted for the hydrogens or hydrazine, the specific impulse of the compound is decreased, speaking in terms of rocket fuel performance. Hence, an embodiment of this invention comprises a composition in which at least about 75% of the total number of the $R_1$, $R_2$, $R_3$, and $R_4$ groups are hydrogen atoms. A preferred embodiment comprises a composition in which at least about 90% of the total number of $R_1$, $R_2$, $R_3$, and $R_4$ groups in said composition as a whole are hydrogen atoms in which case a minimum decrease in specific impulse is occasioned. Another embodiment is a composition in which the hydrazine type compound has at least one hydrogen atom attached to each nitrogen, as when $R_2$ and $R_3$ are hydrogen atoms. In the latter instance, the performance and physical properties of the hydrazine compound as a rocket fuel are enhanced.

An especially preferred embodiment of this invention comprises a composition in which the $R_1$, $R_2$, $R_3$ and $R_4$ groups are substantially all hydrogen atoms, in which case the particular hydrazine-containing composition has the maximum specific impulse in proportion to its hydrazine content. The hydrocarbon groups which replace the hydrogen atoms on the hydrazine can have from one to about twelve carbon atoms. Since, however, the specific impulse decreases with increase in the number of carbon atoms in the hydrocarbon group, it is preferable that the latter have from one to about eight carbon atoms. The hydrocarbon groups can be alkyl, cycloalkyl, aryl, arylalkyl, alkaryl, etc. Non-limiting examples of hydrazine compounds are: hydrazine, methyl hydrazine, dimethyl hydrazine, trimethyl hydrazine, tetramethyl hydrazine, ethyl hydrazine, diethyl hydrazine, methyl ethyl hydrazine, propyl hydrazine, dibutyl hydrazine, phenyl hydrazine, diphenyl hydrazine, methyl, methyl phenyl hydrazine, etc.

When the carbon, hydrogen, and nitrogen-containing compounds employed in the composition of this invention are amines, they may be primary, secondary, or tertiary amines. The hydrocarbon parts of the amino-substituted compound may be straight chain, branched chain, or cyclic. The hydrocarbon part may be saturated or unsaturated aliphatic, or aromatic. Non-limiting examples of amino nitrogen-containing hydrocarbons are: methylamine, dimethylamine, trimethylamine, ethylamine, diethylamine, propylamine, butylamine, amylamine, hexylamine, octylamine, laurylamine, ethylenediamine, trimethylenediamine, hexamethylenediamine, octamethylenediamine, dodecamethylenediamine, diethylenetriamine, triethylenediamine, hexaethyleneheptamine, dimethyltriethylenediamine, cyclohexylamine, allylamine, piperidine, aniline, N-methylaniline, N,N-diethylaniline, toluidine, phenylenediamine, anisidine, diphenylamine, etc. When the carbon, hydrogen, and nitrogen-containing compounds are heterocyclic nitrogen compounds, they include 2-aminopyridine and 3-amino quinoline, etc. While compounds having from one to about twelve carbon atoms, and from one to about seven nitrogen atoms, are used in the preparation of the composition of this invention, the preferred amines are those having from one to about eight carbon atoms and from one to about three nitrogen atoms, as it is found that these compounds impart the highest degree of stability to the hydrazine with a minimum decrease in the specific impulse.

The hydroxy-substituted hydrocarbons which are employed in preparing the compositions of this invention include compounds such as alcohols, phenols, naphthols, alkylene oxides, and diphenylene oxide. The alcohols include aliphatic alcohols, both saturated and unsaturated, having either straight or branch chain hydrocarbon components in the compound. Nonlimiting examples of the alcohols include: methyl alcohol, ethyl alcohol, n-propyl alcohol, isopropyl alcohol, allyl alcohol, n-butyl alcohol, isobutyl alcohol, tert-butyl alcohol, cyclohexanol, octanol, louryl alcohol, benzyl alcohol, cyclopentanol, glycol, diethyleneglycol, triethyleneglycol, hexaethyleneglycol, glycerol, 1,2,3,4,5,6-hexahydroxyhexane, etc. Nonlimiting examples of hydroxy-substituted aromatic hydrocarbon include such compounds as: phenol, o-, m-, and p-cresol, hydroxydiphenyl, cyclohexylphenol, thymol, guiacol, eugenol, catechol, pyrogallol, hexahydroxybenzene, naphthol, etc. While hydroxy-substituted hydrocarbons having from one to about twelve carbon atoms and from one to about six hydroxy groups are employed in the composition, the preferred hydroxy-substituted hydrocarbons are those having from one to about eight carbon atoms and from one to about three hydroxy groups, with from zero to about four ether-type oxygen atoms in the compound, i.e., oxygen atoms which are connected by single bonds to two different carbon atoms which in turn are bonded to each other only through said oxygen atom. The compounds having one to about eight carbon atoms, etc., are preferred since they impart the maximum amount of stability to the hydrazine with the minimum decrease in the overall specific impulse.

Non-limiting examples of hydrocarbon compounds having both hydroxy substituents and amino nitrogens therein, include: ethanolamine, diethanolamine, triethanolamine, 1-hydroxy - 6 - amino-hexane, 1-hydroxy-2-amino dodecane, 1-hydroxy-8-amino octane, o-aminophenol, m-aminophenol, p-aminophenol, p,p¹-di(hydroxyphenyl)amine, tri-2 - (2-hydroxyethoxy)ethylamine, $(HOC_2H_4—O—C_2H_4)_3N$, etc. As above, hydroxy and amino-substituted hydrocarbons having from two to about eight carbon atoms, one to about three hydroxy groups, from one to about three nitrogen atoms, and from zero to about three ether-linked oxygen atoms are preferred.

The ketones which are employed as a component in the composition of this invention include such compounds as acetone, methyl ethyl ketone, pentyl hexyl ketone, propylbutyl ketone, acetoacetone, urea, N-methyl urea, N,N′-dimethyl urea, N-ethyl urea, N,N′-dibutyl urea, etc. Thus, the ketones have from one to about twelve carbon atoms, from one to about three oxygens, and from zero to about two amino nitrogens. Compounds having from one to about eight carbon atoms, one oxygen atom, and from zero to about two nitrogen atoms are preferred for the reasons given above.

The amount of the additive compounds in the composition, as stated hereinabove, is from about 0.5 weight percent to about 25 weight percent based on the total weight of the composition. While less than about 0.5 weight percent of the additive compounds may be employed in the composition, it is found, however, that any amount below this figure does not significantly enhance the stability of the hydrazine compound. Amounts of the stabilizing compound above about 25 weight percent can also be used, however, in order not to decrease the specific impulse of the composition, amounts of the stabilizing compound above about 25 weight percent are not contemplated. Significant improvement in the stability of the hydrazine compound-containing composition, with a minimum of loss in the specific impulse characteristic of the composition, is achieved when the stabilizing compounds are employed in amounts of from about two to about twenty weight percent, based on the total weight of the composition, and this, therefore, constitutes a preferred embodiment of this invention. For example, hydrazine containing ten weight percent ethanol, based on the total weight of hydrazine and ethanol, is stabilized to the point that no explosion occurs when the composition is employed in the operation of a rocket motor. When hydrazine is employed as a fuel without any stabilizing compound added, the rocket motor in which it is used explosively disintegrates after ignition of the fuel in the combustion chamber.

An especially preferred amount in which the propellant-improving compounds are added to the hydrazine composition is from about five to about fifteen weight percent, based on a total weight of the composition. It is found that amounts of the improving component within this range stabilize the hydrazine composition considerably against explosive decomposition over a wide variation of operating conditions.

All the chemical compounds which constitute components of the composition of this invention are well known and are commercially available. Processes for their preparation are described in standard chemical texts such as "Organic Chemistry," by Fieser and Fieser, 1944 Edition, published by D. C. Heath and Company, New York, as well as other published literature in the chemical field. A lengthy discourse on the preparation of the various compounds is, therefore, not included in this writing.

The rocket propellant compositions of this invention are prepared by mixing the various components together in the amounts required to obtain the desired composition and then subjecting the mixture to agitation as by stirring, shaking, etc., until a homogeneous composition is obtained. It is immaterial in what order the components are added to the container in which the mixing is effected. For example, the additive may be added to the hydrazine compound or conversely the hydrazine compound may be added to the additive or combination of two or more additives.

The following examples are illustrative of the compositions of this invention and their performance.

EXAMPLE I

To a container equipped with means for agitation were added 80 parts by weight of hydrazine and 20 parts by weight of ethanol. The mixture was subjected to agitation until a homogeneous composition was obtained. The composition was then ignition-tested in a reaction chamber consisting of an upright stainless steel tube, closed at its lower end and equipped with heating means and temperature-indicating means at the bottom. The reaction chamber was equipped with Pyrex glass windows in the walls of the tube to permit visual and camera coverage of the reaction in the chamber. A catalyst, consisting of a 50/50 mixture by weight of copper oxide and ferric oxide, was placed on the heated bottom surface of the stainless steel reaction chamber. A Tesla coil was equipped with a long, insulated, steel extension. The extension or lead from the Tesla coil was then inserted into the reaction chamber so that the tip of the lead was approximately five millimeters from the catalyst surface. The reaction chamber was equipped with gas inlet means, the opening of which was positioned approximately five millimeters over the catalyst surface. A nitrogen atmosphere was maintained within the reaction chamber by supplying a flow of nitrogen through the gas inlet means prior to fuel injection. The hydrazine-ethanol composition was tested in the reaction chamber by introducing a drop of the composition through the open upper end of the chamber with the aid of gravity so that the drop fell onto the catalyst surface while the Tesla coil was in operation producing a high voltage spark for ignition purposes. The bottom of the chamber and catalyst surface was maintained at a temperature of substantially 450° F. When a drop of the composition was introduced on to the catalyst surface, it was observed to vaporize smoothly on contact, ignite, and burn evenly. There was no violent or explosive ignition of the drop.

EXAMPLE II

The procedure of Example I was repeated, using hydrazine without any additive. The drop of hydrazine, upon coming in contact with the catalyst surface, ignited rapidly and reacted violently.

The following table illustrates other compositions of this invention and their performance in the reaction chamber described in Example I.

TABLE 1

| Number: | Compounds added to hydrazine | Wt. percent additive | Observation upon contact with catalyst surface |
|---|---|---|---|
| 1 | None (hydrazine alone) | 0 | Fast, violent, explosive ignition of vapor. |
| 2 | Ethylamine | 10 | Slow, even ignition of vapor. |
| 3 | Ethylene diamine | 10 | Do. |
| 4 | Diethylene triamine | 10 | Do. |
|   |   | 20 |   |
| 5 | Triethylene tetramine | 10 | Do. |
|   |   | 20 | Do. |
| 6 | Diethylamine | 10 | Do. |
| 7 | Propylene diamine | 10 | Do. |
|   |   | 20 | Do. |
| 8 | Aniline | 10 | Do. |
|   |   | 20 | Do. |
| 9 | O-toluidine | 10 | Do. |
| 10 | 2,4-toluine diamine | 10 | Do. |
|   |   | 20 | Do. |
| 11 | p-Phenylene diamine | 10 | Do. |
|   |   | 20 | Do. |
| 12 | Benzedine | 10 | Do. |
| 13 | 2-amino pyridine | 10 | Do. |
|   |   | 20 | Do. |
| 14 | Quinoline | 5 | Do. |
|   |   | 10 | Do. |
| 15 | 3-amino quinoline | 10 | Do. |
|   |   | 20 | Do. |
| 16 | Ethanol | 10 | Do. |
|   |   | 20 | Do. |
| 17 | Propanol | 10 | Do. |
|   |   | 20 | Do. |
| 18 | Cyclopentanol | 20 | Do. |
| 19 | Cyclohexanol | 20 | Do. |
| 20 | Benzyl alcohol | 10 | Do. |
|   |   | 20 | Do. |
| 21 | Phenylethyl alcohol | 10 | Do. |
|   |   | 20 | Do. |
| 22 | 2,6-dimethyl phenol | 10 | Do. |
|   |   | 20 | Do. |
| 23 | Pyrogallol | 10 | Do. |
|   |   | 20 | Do. |
| 24 | α-Naphthol | 10 | Do. |
| 25 | Hydroquinone | 10 | Do. |
| 26 | Ethanolamine | 10 | Do. |
| 27 | Diethanolamine | 10 | Do. |
|   |   | 20 | Do. |
| 28 | Triethanolamine | 10 | Do. |
| 29 | p-Aminophenol | 10 | Do. |
|   |   | 20 | Do. |
| 30 | α-Naphtholamine | 10 | Do. |
| 31 | β-Hydroxypyridine | 10 | Do. |
|   |   | 20 |   |
| 32 | β-Hydroxyethyl hydrazine | 10 | Do. |
|   |   | 20 | Do. |
| 33 | Methyl hydrazine | 10 | Do. |
|   |   | 20 | Do. |
| 34 | Phenyl hydrazine | 10 | Do. |
|   |   | 20 | Do. |
| 35 | Phenyl urea | 10 | Do. |

To obtain more quantitive values of the above observations, measurements were made of chamber temperature and pressure and recorded on oscillograph papers. The chamber was a closed high pressure, high temperature, stainless steel chamber having an outer diameter of two inches and a length of twelve inches. The chamber was heated externally, and maintained at about 525° F. The inner bottom of the chamber was heated to and maintained at about 1200° F. by means of a stainless steel sheathed, electric cartridge heater. Port holes at the top of the chamber fed all the necessary instruments and equipment into the chamber. The chamber was equipped with a gas inlet and a gas outlet means. The opening of the gas inlet means was positioned approximately five millimeters from the bottom of the chamber. A pressure gage to show the chamber pressure visually was attached to the gas inlet means. A pressure pick-up for recording the chamber pressure on an oscillograph was attached to the gas inlet means. A temperature controller thermocouple was inserted into the chamber and attached to the cartridge heater to maintain a constant temperature of substantially 1200° F. Another thermocouple was inserted into the chamber to record on the oscillograph the temperature of the gas space near the 1200° F. surface. The gas outlet means was equipped with a burst diaphragm to provide pressure safety relief. The fuel to be injected into the chamber was trapped between two three-way valves. The hydrazine-additive composition was tested in the chamber by opening these two valves simultaneously under a pressure of 100 lbs. nitrogen. This injected the trapped, measured amount, two cubic centimeters, of fuel into the chamber. The injection was done automatically with an "Eagle" timer sequencer. The oscillograph recorder was turned on prior to fuel injection to record the chamber temperature and pessure when the fuel vaporized and ignited upon contact with the 1200° F. surface. Typical oscillograph-recorded measurements which substantiate the hereinabove discussed visual observations are given below.

TABLE II

| Compounds added to hydrazine | Wt. percent additive | Ignition delay time between injection (vaporization) and ignition in milliseconds | At ignition Peak pressure developed, p.s.i.g. | At ignition Maximum rate pressure rise, p.s.i./m.s. |
|---|---|---|---|---|
| Number: | | | | |
| 1. None (anhydrous hydrazine) | | 82 | 180 | 13 |
| 2. Ethylene diamine | 10 | 230 | 94.5 | 6.3 |
| 3. Cyclopentanol | 10 | 210 | 93 | 5.6 |
|   | 20 | 485 | 52 | 2.0 |
| 4. Cyclohexanol | 10 | 160 | 92 | 6.1 |
| 5. Ethanol | 10 | 125 | 110 | 6.9 |
|   | 20 | 320 | 51 | 2.1 |

The decrease in the peak pressure developed and the decrease in the maximum rate of pressure rise, as shown in Table II, indicates that the rate of chemical reaction has been repressed. In other words, the fuel has been stabilized so that its combustion can be controlled.

The following table illustrates still other compositions of this invention.

TABLE III

| Compounds added to hydrazine | Weight percent additive |
|---|---|
| No.: | |
| 1. Methylamine | 25 |
| 2. Dodecylamine | 15 |
| 3. Octylamine | 5 |
| 4. Cyclohexylamine | 2 |
| 5. Ethylamine | 0.5 |
| 6. Hexaethyleneheptamine | 10 |
| 7. Diphenylamine | 7 |
| 8. Triethylamine | 10 |
| 9. Allylamin | 1 |
| 10. Methanol | 25 |
| 11. 1-hydroxyoctane | 15 |
| 12. Allylalcohol | 2 |
| 13. Ethylene glycol | 5 |
| 14. Glycerol | 0.5 |
| 15. Phenol | 10 |

TABLE III—Continued

| Compounds added to hydrazine | Weight percent additive |
|---|---|
| No.: | |
| 16. Cresol | 15 |
| 17. Hexahydroxybenzene | 0.5 |
| 18. Diethyleneglycol | 5 |
| 19. Hexaethylene glycol | 10 |
| 20. Ethanolamine | 0.5 |
| 21. Diethanolamine | 5 |
| 22. 1-hydroxy-12-aminododecane | 20 |
| 23. Triethanol amine | 25 |
| 24. 1-hydroxy-8-amino octane | 15 |
| 25. Tri-2-(2-hydroxyethoxy)ethylamine | 2 |
| 26. Acetone | 10, 20 |
| 27. Methyl ethyl ketone | 2 |
| 28. Dipropylbutyl ketone | 5 |
| 29. 2,4-pentanedione | 15 |
| 30. Allylphenone | 25 |
| 31. 2,4,5-octanetrione | 10 |
| 32. Urea | 10 |
| 33. N-methylurea | 25 |
| 34. N-dodecylurea | 5 |
| 35. N,N'-dimethylurea | 2 |
| 36. N-ethylurea | 15 |
| 37. N-allylurea | 0.5 |
| 38. Ethanol / Ethylamine / Aniline | 15 / 5 / 5 |
| 39. Acetone / α-Naphtol / Diethylenetriamine / o-Toluidine / N-methylurea | 2 / 3 / 1 / 1 / 3 |
| 40. Cyclopentanol / Unsymmetrical dimethyl hydrazine | 5 / 25 |

In this table set out above, and throughout this writing, the weight percent of additive is based on the total weight of the composition.

The performance of the compositions of this invention as rocket propellants was investigated by operating stationary rocket motors using the improved hydrazine compositions of this invention as the propellant fuel together with a suitable oxidizer. The rocket engine employed in the tests had a throat area of 67.2 sq. in. The ratio of the cross-sectional area of the nozzle exit-to-throat cross-sectional area was 25:1. The ratio of the cross-sectional area of the combustion chamber to the cross-sectional area of the throat was 1.8:1. The motor was operated at a combustion chamber pressure of 750 p.s.i.a. and an exit nozzle pressure of substantially 13.6 p.s.i.a. The fuel composition and oxidizer were fed through separate conduits from individual storage containers to the combustion chamber where the stream of fuel composition and the stream of oxidizer contacted each other. The fuel oxidizer ignited on contact, producing gaseous products as a result of the spontaneous combustion of the components of the two streams. The gaseous products were ejected from the combustion chamber through the throat area and then out into the atmosphere through the exit nozzle. The ejection of the reaction product gases from the combustion chamber produces a thrust which is measured by means of a load cell mounted forward of the motor. The fuel composition and the oxidizer were metered into the motor so that the amount reacting within any particular period of time was known.

EXAMPLE III

The rocket motor described hereinabove was operated on a fuel composition consisting essentially of 90 parts by weight hydrazine and 10 parts by weight ethylenediamine. The oxidizer used was nitrogen tetroxide, $N_2O_4$, at a weight ratio of fuel-to-oxidizer of 1.128. The pressure measured in the combustion chamber was 759.8 p.s.i.a., with the pressure at the exit nozzle 13.7 p.s.i.a. The force as measured by the load cell, was 62,496 lbs., while the flow of fuel and oxidizer was substantially 26.8 lbs. per second, giving a specific impulse, $I_s$, of 233.3 seconds. The motor was operated for 18 seconds. No explosion occurred.

EXAMPLE IV

The procedure of Example III was repeated, using a fuel consisting essentially of 90 parts by weight of hydrazine and 10 parts by weight of ethanol. Nitrogen tetroxide was the oxidizer, with a fuel-to-oxidizer weight ratio of 1.3. The combustion chamber pressure was 707 p.s.i.a. and the pressure at the exit nozzle was 13.8 p.s.i.a. The force, as measured by the load cell, was 62,342 lbs., and the flow of oxidizer and fuel was substantially 27.7 lbs. per second, giving a specific impulse, $I_s$, of 224.6 seconds. The motor was operated for 18 seconds. No explosion occurred.

EXAMPLE V

The motor described above was operated on hydrazine fuel with no additive. The motor disintegrated explosively after ignition of fuel and oxidizer in the combustion chamber.

When the procedure of Example III is repeated with a fuel composition consisting essentially of 75 parts by weight of hydrazine and 25 parts by weight of diethylene triamine, with hydrogen peroxide as the oxidizer, and an oxidizer-to-fuel weight ratio equivalent to 0.5 of the stoichiometric value, satisfactory operation of the motor is observed. Good results are also obtained when a fuel composition consisting of hydrazine containing ten weight percent triethylamine is employed, using chlorine trifluoride as the oxidizer, with an oxidizer-to-fuel weight ratio equivalent to 0.8 of the stoichiometric value. Likewise, good results are obtained when a fuel composition consisting of hydrazine containing 25 weight percent of unsymmetrical dimethylhydrazine and 5 weight percent methylamine, based on the total weight of the composition, is employed as the fuel, and bromine pentafluoride as the oxidizer, with an oxidizer-to-fuel weight ratio equivalent to unity in terms of the stoichiometric value. Improved operation of the rocket motor is also observed when a fuel composition comprising 80 parts by weight hydrazine containing 0.5 parts by weight methylhydrazine, and 20 parts by weight acetone is employed with liquid oxygen as the oxidizer, with an oxidizer-to-fuel weight ratio equivalent to 1.2 of the stoichiometric value of the ratio. In like manner, improved operation of the rocket motor is observed when the fuel is composed of 75 weight percent hydrazine, 5 weight percent aniline, 5 weight percent cyclopentanol, 5 weight percent dodecylamine, 1 weight percent allylamine, 1 weight percent octanol, 3 weight percent glycerol, 1 weight percent diethylene glycol, 2 weight percent cresol, and 2 weight percent dibutyl ketone, with white fuming nitric acid as the oxidizer, and an oxidizer-to-fuel weight ratio equivalent to two times the stoichiometric value of the ratio. In like manner, the operation of the motor is improved when the fuel is composed of 85 weight percent hydrazine, 5 weight percent, N,N-dimethylurea, and 5 weight percent of o-toluidine, and red fuming nitric acid is used as the oxidizer, with an oxidizer-to-fuel weight ratio of 1.5 times the stoichiometric value of the ratio. Improved performance in the rocket motor is also obtained when the motor is operated on the compositions shown in the tables hereinabove with oxidizers which include liquid fluorine, liquid fluorine and liquid oxygen mixtures of from about 5 to about 95 mol percent flourine in oxygen, nitrogen tetroxide, perchloryl fluoride having the general formula $FClO_3$ and nitrogen trifluoride.

The ratio of oxidizer-to-fuel is calculated on a weight basis. The values given above are in terms of multiples of the stoichiometric value of the ratio. The stoichiometric value of the ratio can be further defined as that value of the ratio when the oxidizer and fuel are used in stoichiometric proportions. The oxidizer-to-fuel weight ratio can vary from about 0.5 of the stoichiometric ratio value to about two times the stoichiometric ratio value. For better rocket performance with respect to thrust and range, however, oxidizer-to-fuel weight ratios equivalent to from about 0.8 to about 1 of the stoichiometric ratio value are preferred.

When a flight rocket is operated employing the composition of Example I, satisfactory flight performance, with no detrimental explosions, is observed. Satisfactory performance is also observed when a flight rocket is operated on the fuel compositions with additives of Examples I, III, IV, and Tables I, II, and III.

From the discussion and examples given hereinabove, it is seen that a novel rocket propellant fuel is provided having enhanced stability and a high specific impulse upon use in a rocket motor. A word of caution with respect to the use of these compositions as rocket propellants may be in order at this point. Rocket fuels in general are highly explosive, and explosions may occur even when it is believed that all safety precautions have been observed. It is, therefore, advisable to treat all rocket fuel compositions as highly explosive and dangerous materials for handling purposes. For example, hydrazine fuel with added ethanolamine in the amount of ten weight percent, when properly mixed so as to produce a homogeneous composition, enhances the thermal stability of the fuel. If, however, the etanolamine is not thoroughly mixed with the hydrazine, explosion of the hydrazine upon heating may readily occur.

While the composition and method of this invention have been described in some detail with the use of specific illustrative examples, it is not intended that the spirit or scope of this invention be limited except as indicated in the appended claims.

We claim:

1. A composition of matter consisting essentially of (1) a hydrazine compound having the general formula $R_1R_2NNR_3R_4$, wherein each of $R_1$, $R_2$, $R_3$, and $R_4$ is selected from the class consisting of hydrogen and hydrocarbon groups having from 1 to about 12 carbon atoms and wherein at least about 75 percent of the sum of said $R_1$, $R_3$, $R_2$, and $R_4$ groups in said composition as a whole are hydrogen atoms, and (2) from about 0.5 weight percent to about 25 weight percent, based on the total weight of the composition, of at least one additive compound selected from the class consisting of (a) aliphatic amines containing only carbon, hydrogen, and nitrogen characterized by being free of aromatic substituents and having from 1 to about 12 carbon atoms and from 1 to about 7 nitrogen atoms, (b) amino-substituted heterocyclic amines having up to about 8 carbon atoms, (c) hydroxy-substituted aromatic hydrocarbons having from 1 to about 12 carbon atoms and from 1 to about 6 hydroxy groups, (d) hydrocarbons having from 2 to 8 carbon atoms and substituted with from 1 to 3 hydroxy groups and at least one amine group, said group containing only carbon, hydrogen, and nitrogen, (e) ureas having from zero to about 9 carbon atoms in the form of hydrocarbon substituents on the nitrogens thereof, (f) alcohol ethers having 2 hydroxy groups, from 1 to about 4 etherlinked oxygen atoms and from 4 to about 12 carbon atoms, and (g) ketones having from 1 to about 12 carbon atoms.

2. The composition of claim 1 wherein (1) is hydrazine and the amount of (2) is from about two to about twenty weight percent.

3. The composition of claim 1 wherein (1) is hydrazine and the amount of (2) is from about five to about fifteen weight percent, based on the total weight of the composition.

4. A composition of matter consisting essentially of hydrazine and from about two to about twenty weight percent, based on the total weight of the composition, of at least one amino nitrogen-containing saturated aliphatic hydrocarbon having from about two to about eight carbon atoms and from one to about three amino nitrogen atoms and containing only carbon, hydrogen and nitrogen.

5. A composition of matter consisting essentially of hydrazine and from about two to about twenty weight percent of ethylene diamine.

6. A method of producing thrust which comprises ejecting from a reaction chamber the gaseous products produced by the spontaneous combustion of an oxidizing agent consisting essentially of nitrogen tetroxide and a liquid fuel composition consisting essentially of hydrazine and from about two to about twenty weight percent of ethylene diamine.

7. The composition of claim 1, wherein at least 90 percent of the sum of the $R_1$, $R_2$, $R_3$, and $R_4$ groups of said composition as a whole are hydrogen atoms.

8. A method of stabilizing against combustion instability in a combustion chamber upon the combustion of an oxidizer and a liquid fuel composition which comprises accomplishing said combustion with an oxidizer and a fuel consisting of a composition of matter comprising (1) a hydrazine compound having the general formula $R_1R_2NNR_3R_4$, wherein each of $R_1$, $R_2$, $R_3$, and $R_4$ is selected from the class consisting of hydrogen and hydrocarbon groups having from 1 to about 12 carbon atoms and wherein at least about 75 percent of the sum of said $R_1$, $R_2$, $R_3$, and $R_4$ groups in said composition as a whole are hydrogen atoms, and (2) from about 0.5 weight percent to about 25 weight percent, based on the total weight of said composition, of at least one additive compound selected from the class consisting of (a) aliphatic amines containing only carbon, hydrogen, and nitrogen characterized by being free of aromatic substituents and having from 1 to about 12 carbon atoms and from 1 to about 7 nitrogen atoms, (b) amino-substituted heterocyclic amines having up to about 8 carbon atoms, (c) hydroxy-substituted aromatic hydrocarbons having from 1 to about 12 carbon atoms and from 1 to about 6 hydroxy groups, (d) hydrocarbons having from 2 to 8 carbon atoms and substituted with from 1 to 3 hydroxy groups and at least one amine group, said amine group containing only carbon, hydrogen, and nitrogen, (e) ureas having from zero to about 9 carbon atoms in the form of hydrocarbon substituents on the nitrogens thereof, (f) alcohol ethers having 2 hydroxy groups, from 1 to about 4 ether-linked oxygen atoms and from 4 to about 12 carbon atoms, and (g) ketones having from 1 to about 12 carbon atoms.

9. A composition of matter consisting essentially of hydrazine and from about 0.5 weight percent to about 25 weight percent, based on the total weight of the composition, of at least one aliphatic amine containing only carbon, hydrogen, and nitrogen characterized by being free of aromatic substituents.

10. A method of producing thrust which comprises ejecting from a reaction chamber the gaseous products produced by the spontaneous combustion of an oxidizer and a liquid fuel composition consisting essentially of hydrazine and from two to about twenty weight percent, based on the total weight of the composition, of at least one amine containing no aromatic hydrocarbon substituents having from about 2 to about 8 carbon atoms and from 1 to about 3 amino nitrogen atoms.

References Cited

UNITED STATES PATENTS

| 2,955,032 | 10/1960 | Osborg | 52—0.5 |
| 2,940,843 | 6/1960 | Wilson | 52—0.5 |
| 2,521,026 | 9/1950 | Solomon | 52—0.5 |
| 2,573,471 | 10/1951 | Malina et al. | 52—0.5 |
| 2,637,161 | 5/1953 | Tschinkel | 60—35.4 |
| 2,680,066 | 6/1954 | Michel | 52—0.5 |
| 2,712,496 | 7/1955 | Skolnik et al. | 52—0.5 |
| 2,824,791 | 2/1958 | Ashey et al. | 60—35.4 |

OTHER REFERENCES

Pub. 505-X prepared by Rocketdyne, a division of North American Aviation, Inc., 6633 Canoga Ave., Canoga Park, Calif., revised Jan. 1, 1959.

BENJAMIN R. PADGETT, Primary Examiner

U.S. CL. X.R.

60—215; 149—36